Figure 1:
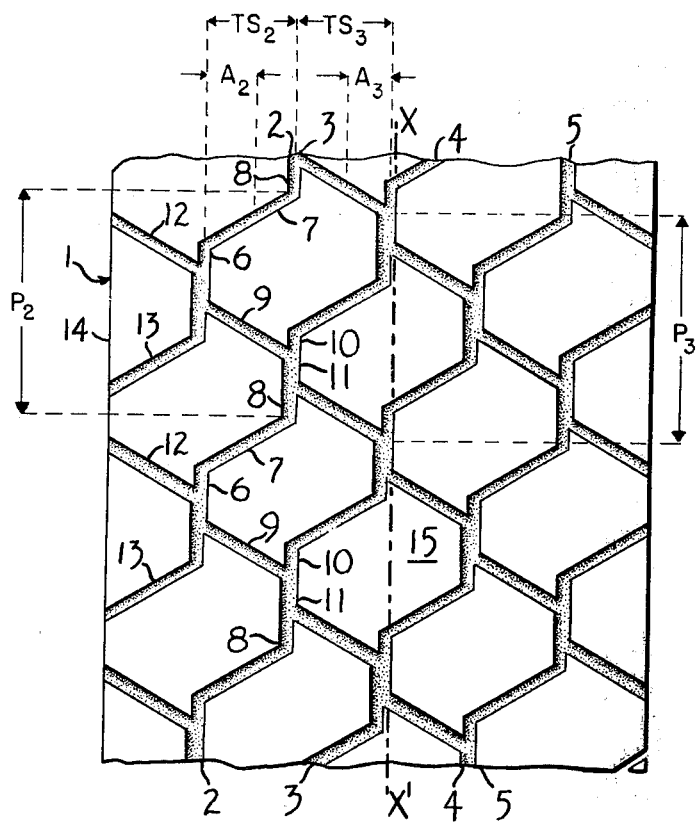

United States Patent [19]
Montagne

[11] 3,986,545
[45] Oct. 19, 1976

[54] TIRE TREAD
[75] Inventor: Jean Bernard Montagne, Cebazat, France
[73] Assignee: Compagnie Generale des Etablissements Michelin, raison sociale Michelin & Cie, France
[22] Filed: June 5, 1975
[21] Appl. No.: 584,200

Related U.S. Application Data
[63] Continuation-in-part of Ser. No. 474,522, May 30, 1974, abandoned.

[30] Foreign Application Priority Data
June 5, 1973 France .............................. 73.20486

[52] U.S. Cl. ............................................. 152/209 R
[51] Int. Cl.² ......................................... B60C 11/06
[58] Field of Search ........................ 152/209 R, 209

[56] References Cited
UNITED STATES PATENTS
3,584,670  6/1971  Verdier .......................... 152/209 R
3,875,986  4/1975  Boileau .......................... 152/209 R Primary Examiner—Drayton E. Hoffman
Attorney, Agent, or Firm—Brumbaugh, Graves, Donohue & Raymond

[57] ABSTRACT

An all weather road tire has a tread provided with juxtaposed circumferential grooves which follow a broken-line outline having segments of longitudinal orientation alternating with oblique segments.

7 Claims, 3 Drawing Figures

TIRE TREAD

This is a continuation-in-part application of U.S. patent application Ser. No. 474,522, filed May 30, 1974, now abandoned.

The present invention relates to tire tread. More particularly, it relates to a tread for new or recapped tires intended for highway travel in all seasons of the year. In order to behave satisfactorily on wet, dry or snow-covered roads, a tire must be provided with a tread which has a number of qualities which are only difficultly compatible with each other.

Thus the adherence to wet ground is poor when the elements in relief are too large a unit area. On the other hand, such elements favor adherence to snow but at the same time cause a disagreeable noise of travel on a dry road.

Moreover, the circumferential grooves favor the maintaining of direction whatever the condition of the road but produce sufficient longitudinal and transverse adherence only on dry roads due to the lack of sharp transverse edges and of drainage canals leading to the edges of the tread.

It has also been discovered that the adherence of a tread is not only a function of the factors enumerated above, but also of the general degree of wear of the tread, and more particularly of the form of local wear assumed by the surfaces of the elements in relief in contact with the road.

The object of the present invention is to overcome the above drawbacks.

Therefore, the tire in accordance with the invention, whose tread is provided with juxtaposed circumferential grooves which follow a broken-line outline having segments of longitudinal orientation, is characterized by the fact that:

a. the outline is composed of segments of longitudinal orientation which alternate with oblique segments, b. the segments of longitudinal orientation of two juxtaposed circumferential grooves have at least one portion in common along only a part of the length of said segments, and c. two consecutive segments of longitudinal orientation of a circumferential groove are staggered with respect to each other in the transverse direction and are connected one to the other by an oblique segment.

By longitudinal orientation there is meant an orientation corresponding to an angle of less than 45° with respect to the longitudinal direction of the tread. Likewise, by oblique orientation there is meant an orientation corresponding to an angle of more than 45° with respect to the longitudinal direction of the tread.

The arrangement of the grooves in accordance with the invention affords the following advantages. The adherence to snow is favored, on the one hand, by the presence of a group of isolated blocks having very angular contours, and, on the other hand, by the presence of transverse groove elements which discharge on the edges of the tread.

The adherence on any wet surface is favored by the presence, between the different circumferential grooves, of a network of transverse intercommunications which discharges laterally.

Moreover, the simultaneous presence on the contour of the blocks of salient angles, both acute and obtuse, causes a slightly different wear of the surface of the blocks, depending on the location, the nature and the amount of these angles. This arrangement is customarily considered harmful.

The surface of the blocks which is intended to enter into contact with the ground thus acquires, as a result of wear, a micro-relief which produces strong local variations in pressure on the ground. This micro-relief favors in this manner the evacuation of the water under the blocks in the direction of the grooves, particularly when the road surface is smooth and wet (for instance, smooth or iced road surfaces); this advantage is present whatever the degree of general wear of the tread.

Preferably juxtaposed circumferential grooves having segments of longitudinal orientation with a common portion along only a part of their length in accordance with the invention are arranged on more than one-half of the width of the tread so as to form a network of grooves with transverse intercommunications extending at least from the middle of the tread up to one of its edges, the middle of the area of contact requiring a particularly large drainage.

In one other preferred embodiment, the consecutive segments of longitudinal orientation of a circumferential groove have different inclinations, preferably of opposite sign, with respect to the longitudinal direction of the tread.

Thus two transverse forces of opposite direction act on the elements in relief defined by the grooves and improve the holding of the course steered particularly on a straight line.

Moreover, the grooving of the tread in accordance with the invention creates a transverse and longitudinal imbrication of the blocks which makes the tread more coherent so as to oppose deformations upon turns. The longitudinal imbrication in particular reduces the noise of travel. Since two juxtaposed circumferential grooves have segments of longitudinal orientation with a common portion along only a part of their length, the blocks touch the ground over a surface which widens progressively and leave the ground via a surface which is reduced progressively. Furthermore, no block touches the ground or leaves it without at least one neighboring block being in contact with the ground. The result is a decrease in the modulation of the noise of travel customarily produced by the blocks. One can further reduce this modulation by juxtaposing circumferential grooves in accordance with the invention having different amplitudes and/or pitches. As is well known to those skilled in the tire tread art, the amplitude of such a circumferential groove is half the transverse span of this groove and the pitch is the circumferential between two analog segments of the groove. This makes it possible locally to vary the transverse and longitudinal imbrications. In particular, transverse amplitudes of grooves crossing from the inner edge towards the outer edge (with respect to the vehicle) improve the wear and the behavior on turns without substantially decreasing the adherence.

Figure 3:
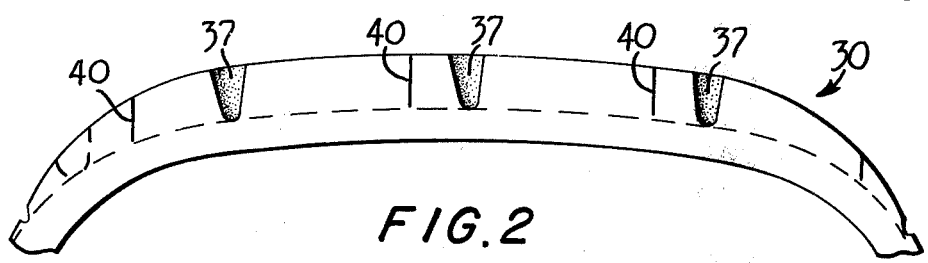
Figure 2:
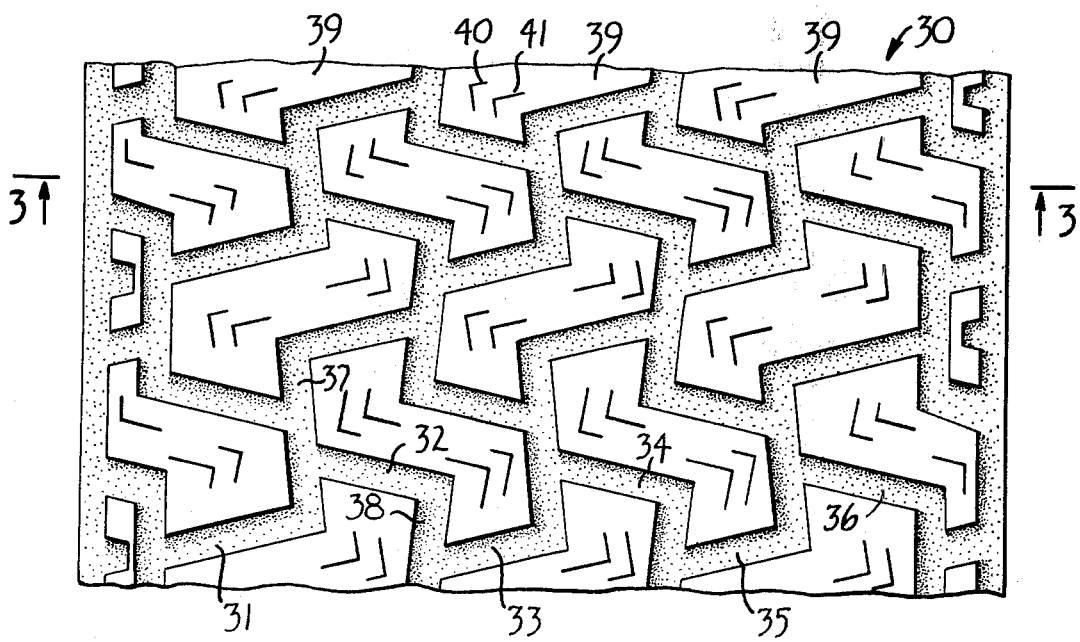

The invention will be fully understood by means of the accompanying drawing and the description thereof which illustrate nonlimitative embodiments. In the drawing:

FIG. 1 shows diagrammatically a sector of a tread in accordance with the invention in the special case where the segments of longitudinal orientation of the juxtaposed circumferential grooves are of the same length, FIG. 2 shows a sector of a tread in accordance with the invention in which the consecutive segments of longitudinal orientation of a circumferential groove are inclined in opposite directions, and FIG. 3 shows a radial section through the sector of tread of FIG. 2 taken on line 3—3.

FIG. 1 shows a tread 1 provided with four juxtaposed circumferential grooves 2 to 5 in accordane with the invention. The circumferential groove 2 has staggered longitudinal consecutive segments 6 and 8 and oblique segments 7 and 9.

The staggered longitudinal segments 6 and 8 are connected by means of oblique segments 7 and 9. The longitudinal segments 6 of the circumferential groove 2 are connected to the edge 14 of the tread 1 by means of oblique segments 12 and 13. Two juxtaposed circumferential grooves, such as 2 and 3, have longitudinal segments 8 and 10 which have a portion 11 in common along only a part of their length.

The longitudinal direction of the tread being indicated by the longitudinal axis XX', FIG. 1 shows that the blocks 15 formed by the grooves 2 to 5 in accordance with the invention are very angular and come into contact with the ground by means of a surface which widens progressively in the longitudinal direction. From FIG. 1 there can also be noted the longitudinal and transverse imbrication of the blocks 15 formed by the juxtaposed circumferential grooves 2 to 5, as well as the transverse drainage network provided as a result of the arrangement in accordance with the invention.

The circumferential groove 2 has a transverse span $TS_2$, an amplitude $A_2$ and a pitch $P_2$ while the juxtaposed circumferential groove 3 has a transverse span $TS_3$, an amplitude $A_3$ and a pitch $P_3$. The amplitudes $A_2$ and $A_3$ can be different in amount and/or the pitches $P_2$ and $P_3$ can be different in amount.

FIG. 2 shows in greater detail on a scale close to actual size, a sector of a tread 30 of a tire of size 175-R 14. This tread has six juxtaposed circumferential grooves 31 to 36 in accordance with the invention. This example corresponds to the variant embodiment which provides different inclinations of the consecutive segments of longitudinal orientation 37 and 38 of the same circumferential grooves, such as 32. In this example, this inclination is + 7.5° in the case of segment 37 and − 7.5° in the case of segment 38. The blocks 39 defined by the circumferential grooves 31 to 36 furthermore have cuts, such as 40 and 41, which also contribute to the forming of a micro-relief which is favorable for the behavior of the tire of the invention on a slippery and wet road covering.

What is claimed is:

1. In a tire whose tread is provided with juxtaposed circumferential grooves which follow a broken-line outline having segments of longitudinal orientation, the outline being composed of segments of longitudinal orientation forming an angle of less than 45° with respect to the longitudinal direction of the tread which alternate with oblique segments forming an angle of more than 45° with respect to the longitudinal direction of the tread, two consecutive segments of longitudinal orientation of a circumferential groove being staggered with respect to each other in the transverse direction and being connected one to the other by an oblique segment, the improvement which comprises the segments of longitudinal orientation of two juxtaposed circumferential grooves having at least one portion in common along only a part of the length of said segments.

2. The tire according to claim 1 wherein the circumferential grooves are juxtaposed starting from one edge of the tread over more than half of the width of the tread so as to form a transverse drainage network.

3. The tire according to claim 1 wherein the juxtaposed circumferential grooves have different amplitudes.

4. The tire according to claim 1 wherein the juxtaposed circumferential grooves have different pitches.

5. The tire according to claim 1 wherein the juxtaposed circumferential grooves have different amplitudes and pitches.

6. The tire according to claim 1 wherein the consecutive segments of longitudinal orientation of a circumferential groove have different inclinations with respect to the longitudinal direction of the tread.

7. The tire according to claim 6 wherein the inclinations are of opposite sign.

* * * * *